United States Patent [19]

Cook

[11] Patent Number: 4,687,623
[45] Date of Patent: Aug. 18, 1987

[54] SELF-COMPENSATING VOTED LOGIC POWER INTERFACE WITH TESTER

[75] Inventor: Henry F. Cook, Penn Hills Township, Allegheny County, Pa.

[73] Assignee: Westinghouse Electric Corp., Pittsburgh, Pa.

[21] Appl. No.: 793,422

[22] Filed: Oct. 31, 1985

[51] Int. Cl.[4] ............................................. G21C 17/00
[52] U.S. Cl. .................................. 376/259; 324/415; 371/36; 376/215
[58] Field of Search ................................. 376/215–217, 376/259; 324/415 R, 73 R; 371/36

[56] References Cited

U.S. PATENT DOCUMENTS

| | | | |
|---|---|---|---|
| 3,115,451 | 12/1963 | Strong et al. | 376/215 |
| 3,223,590 | 12/1965 | Troeger | 376/215 |
| 3,424,652 | 1/1969 | Oehmann | 376/259 |
| 3,437,556 | 4/1969 | Bevilacqua et al. | 376/259 |
| 3,748,540 | 7/1973 | Eggenberger et al. | 324/415 R |
| 3,892,954 | 7/1975 | Neuner | 324/73 R |
| 3,967,257 | 6/1976 | Hager | 340/664 |
| 4,434,132 | 2/1984 | Cook | 376/259 |
| 4,517,154 | 5/1985 | Dennis et al. | 376/259 |
| 4,562,035 | 12/1985 | Plaige | 376/259 |

*Primary Examiner*—Salvatore Cangialosi
*Attorney, Agent, or Firm*—Daniel C. Abeles

[57] ABSTRACT

Each of the either normally closed or normally open switches, in an n out of m voted power interface circuit having parallel connected groups of serially connected switches, is shunted by a high impedance resistor to form a leakage path through each group of switches. A detector associated with each group of switches, and responsive to the change of impedance produced by actuation of a resistor shunted switch in the group, generates an output signal, preferably a one bit digital signal, indicative of the state of the switches in the group in response to a sequence of test signals which selectively actuate fewer switches than are required to actuate the load controlled by the power interface. Compensation for large variations in supply voltage is provided by incorporating each group of switches into a resistance measuring bridge circuit in which the digital output signal is generated by a comparator connected across the bridge. Preferably, the bridge circuits share common reference voltage generating legs.

13 Claims, 3 Drawing Figures

SELF-COMPENSATING VOTED LOGIC POWER INTERFACE WITH TESTER

CROSS-REFERENCE TO RELATED APPLICATIONS

Commonly owned U.S. patent application entitled "Voted Logic Power Circuit and Method of Testing the Same" concurrently filed in the names of Bruce M. Cook and Jerzy Gutman and identified by assignee's docket number 52,263.

Commonly owned U.S. patent application entitled "A Voted Logic Power Interface with Tester" concurrently filed in the name of Rober E. Hager and identified by assignee's docket number 52,264.

Commonly owned U.S. patent application entitled "Testable, Fault Tolerant Power Interface Circuit for Normally De-Energized Loads", concurrently filed in the name of Robert A. Hager and identified by assignee's docket No. 52,579.

BACKGROUND OF THE INVENTION

1. Field of the Invention

This invention is directed to systems used to provide automatic responses to abnormal conditions in complex processes such as nuclear reactors, and to apparatus for testing such systems. More particularly, it is directed to means for reliably testing such systems for both normally energized and normally deenergized response devices without interrupting system response to abnormal conditions and despite large variations in energizing voltage.

2. Prior Art

Protection systems for complex processes monitor selected process parameters, such as temperatures, pressures and flows, and the status of various components such as whether a valve is open or closed or whether a pump is on or off, and provide automatic responses to measured values of the parameters and to detected status states of the components which require positive intervention to prevent, or to alleviate the effects of, abnormal process conditions. High reliability is an essential requirement for such a system. In order to enhance reliability, it is common practice to provide redundant sensors for each selected parameter and component status. It is also common practice to vote the responses of the redundant sensors, that is to require that a plurality, but not necessarily all, of the sensors, detect the abnormal condition before action is initiated, in order to reduce the probability of a spurious actuation.

A nuclear power plant is one example of a complex process in which such a protection system is employed. The protection system in a nuclear power plant performs a plurality of functions. It can shutdown, or trip, the reactor if conditions warrant, or it can perform a number of engineered safeguard functions, such as opening or closing valves and turning on or off pumps or other components. Typically, the trip function involves deenergizing electro-mechanical jacks which normally hold control rods in a position withdrawn from the reactor core so that the rods reenter the core and cause it to go subcritical. The engineered safeguard functions may involve either deenergizing a load device which is normally energized or energizing a device which is normally deenergized. In a typical engineered safeguard function system, four redundant sensors are used to detect the selected parameters and/or status conditions. The response of each sensor is compared with a setpoint value to generate a digital signal which is referred to as a partial actuation signal since an indication from more than one sensor is required to actuate the safety component. The four partial actuation signals for each parameter or status condition are all fed to each of two identical, electrically isolated logic trains. Typically, this is accomplished by applying each partial actuation signal to the coil of a relay having one set of contacts in each logic train. Each logic train independently votes the partial actuation signals, such as two out of four, and generates an actuation signal. The two independently generated actuation signals are then applied to a power interface circuit which requires the presence of both actuation signals to actuate the load device, either a normally energized or normally deenergized component, to initiate the engineered safeguard function. Such a two out of two voting power interface can be disabled by a single failure in one of the two channels. In order to provide tolerance to single failures in a logic train or switching device, the systems described in the related applications referred to above propose the use of two out of three voting power interfaces.

Regulations require that the switching devices comprising the power interface be tested periodically. At present, these tests are performed manually with the plant remaining on line. To avoid disrupting plant operation, special test procedures and circuits have been employed to permit testing without changing the energization status of the actuated device associated with the interface under test.

In the case of a normally energized load which cannot be deenergized while the plant is in operation, the apparatus and method used are as described in U.S. Pat. No. 3,967,257. This involves connecting a current monitor in series with the switching device under test and connecting in parallel with that combination, a second switching device which is also equipped with a visual current monitor. To perform the test, the second switching device is first "closed" in order to maintain power to the load. The device under test is then exercised while the corresponding current monitor is observed as an indication of its switching state. Normally, deenergized loads which cannot be energized during testing are generally tested by exercising the switching devices using a current which is of sufficient magnitude to be detectable but which is below the actuation current threshold for the actuated device.

The prior art systems for testing power interfaces utilize feedback signals which indicate the presence or absence of current in the various circuit legs or they generate analog or digital representations of current magnitude. One problem with test schemes which rely on reading current magnitude is that the current varies as a function of power supply voltage. In the case of a nominal 120 volt DC system, a voltage swing of 50 volts may occur between a low battery condition (approximately 100 VDC) and a full battery or charging condition (approximately 150 VDC).

A primary object of the subject invention is to provide a testable voted logic protection system and particulary a power interface for such a system which is operative with either normally energized or normally deenergized loads without interrupting the protection function and without a change in circuit topology.

It is another important object of the invention to provide such apparatus which is self-compensating for large variations in power supply voltage.

It is still another important object of the invention to provide such apparatus which generates reliable, one bit digital signals in response to test signals.

SUMMARY OF THE INVENTION

These and other objects are realized by an n out of m voted logic power interface circuit in which m sets of switches are arranged in a plurality of groups of switches with the groups of switches connected in parallel with each other and in series with a voltage source and a load. Each group of switches includes a different selection of n switches connected in series, each from a different one of the m sets of switches. The plurality of groups of switches include all possible combinations of m sets taken n at a time such that with at least n out of the m sets of switches actuated the load device is actuated. Each of the switches is shunted by a resistor to provide a leakage path through each group of switches. However, the impedance of the shunt resistors is several magnitudes greater than that of a closed switch so that the leakage current is insufficient to energize the load. Detectors associated with each group of switches, and responsive to changes in impedance in the group, generate output signals indicative of the state of the switches. Preferably, the detectors generate digital signals having a first value when none of the switches are actuated and a second value when at least one switch in the group is actuated.

As used throughout the specification and claims, the term actuated means that the referenced device is in its operated condition. Thus, a normally closed switch is open when actuated, and a normally open switch is closed. Likewise, a normally deenergized load is energized in its actuated state and a normally energized load is deenergized.

In order to provide self-compensation for variations in supply voltage, each group of switches is incorporated into a resistance measuring bridge circuit in which the voltage drop across the resistor shunted switches is compared with a reference voltage. Both of these voltages are proportional to the supply voltage so that reliable indications of switch actuation are generated despite even large fluctuations in supply voltage. Thus, in a wheatstone bridge circuit, the voltage drop across the group of resistor shunted switches forming one leg of the bridge is applied to one input of a comparator and the reference voltage generated by the other side of the bridge is applied to the other comparator input. The three reference resistors in the bridge circuit are selected such that the comparator has two discrete outputs; one when none of the switches are actuated and another when at least one of them is actuated. Preferably, the reference resistors are selected such that the reference voltage developed by the bridge and applied to the comparator is about halfway between the voltage drop across the group of resistor shunted switches when no switches are actuated, and that when at least one switch is actuated, for all supply voltages.

Where the switches are normally closed devices, a bias voltage is added to the reference voltage to assure reliable switching by the comparator.

While suitable for use in other applications, the invention is particularly adapted for use in a protection system for a nuclear power plant where redundant sets of sensors monitor selected reactor parameters and multiple logic trains independently generate a voted logic actuation signal for each set of switches from redundant signals generated by the sensors. A test unit selectively generates test actuation signals and monitors the detectors for preselected patterns of digital signals. By generating fewer actuation signals than are required to actuate the load, the tests can be performed while the protection system remains on line, for both normally energized and normally deenergized loads. Hence, the protection function is not interrupted during test and no changes in circuit topology are required.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
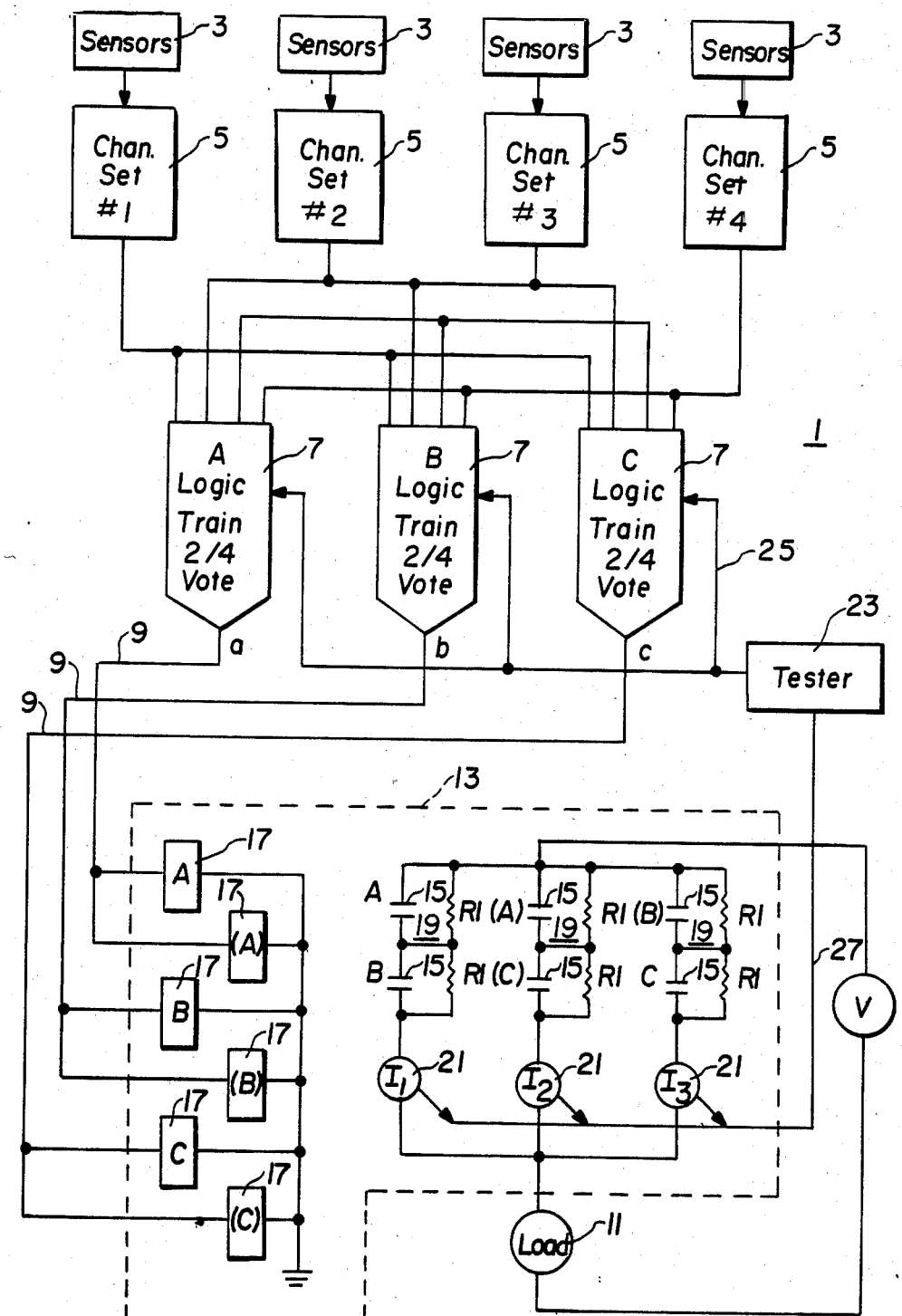
FIG. 1 is a schematic diagram of a protection system for a nuclear power plant incorporating the present invention.

The invention will be described as applied to the protection system for a nuclear power plant although it could also be incorporated into the power interface systems for many other types of complex processes. As shown in FIG. 1, the exemplary system 1 employs four redundant sets of sensors 3 to monitor selected plant parameters such as pressure temperature, flow, radiation level, et cetera, and/or the status of various components, such as whether a valve is open or closed or whether a pump is running or not. Where such a system is used for a particular safeguard function, the sensors 3 may monitor only one or a plurality of plant parameters or conditions. The signals generated by each set of sensors 3 are applied to separate channel sets 5, numbered 1 through 4 in FIG. 1, where the detected values of the sensor signals are analyzed for an indication of an abnormal condition by comparing them with selected setpoint values. In some instances, the values of measured parameters are used to calculate other parameters which are then compared with limiting values for an indication of an abnormal condition as is well-known in the field of control system engineering. Each channel set generates a digital output signal which indicates whether or not the sensors in that channel set are sensing conditions which warrant actuation of the associated safeguard function. Since confirmation by more than one channel set is required to initiate the safeguard function, the digital signals are referred to as "partial actuation signals".

The partial actuation signals from each of the channel sets 5 are each applied to three independent logic trains 7 labeled A, B and C in FIG. 1. In order to provide separation between the redundant partial actuation signals, they are electrically isolated from one another such as by applying each of them to the coil of a separate relay in each logic train as is now common practice. The coil to contact separation of these relays provides the electrical isolation between the actuation signals and between the logic trains. Isolation could also be provided for instance, by optical isolators where solid state switches are used in place of relays.

The logic trains 7 which may preferably comprise microcomputer systems, independently vote the partial trip signals received from the four channel sets 5 and generate an actuation signal a, b or c on their associated output lines 9 when the prescribed number of partial trip signals is detected. Typically, two out of four voting logic is employed by these logic trains. That is, two out of the four channel sets must be generating a partial actuation signal in order for the logic train to generate an actuation signal. Such a scheme allows for failures which preclude the generation of a partial actuation signal by two of the channel sets, while reducing the likelihood of a spurious trip which could occur if only one partial trip signal was required to generate an actuation signal. In the normal course of events, all four channel sets would generate partial actuation signals upon the occurrence of the abnormal condition, and all three logic trains 7 would generate an actuation signal. Of course, voting strategies other than two out of four could be employed by the logic trains 7.

The actuation signals on the leads 9 are utilized to control the energization of a load device 11 by a voltage source V through a power interface identified generally in FIG. 1 by the reference character 13. The load device 11 may be any type of electrically operated device which effects an automatic response to the detection of the associated abnormal condition. Such a device could be for example, a pump, an electrically controlled valve, a heater, a circuit breaker or any motor driven device. In the system of FIG. 1, the load device would be a normally deenergized device, but as will be seen, the invention can also be used with normally energized load devices also.

The power interface 13 includes a network of switches connected in series with the load device 11 across the voltage source V. In the circuit of FIG. 1, the switches are the normally open contacts 15 of relays A, (A), B, (B), C and (C). The coils 17 of two relays are connected to the output line 9 from each logic train 7. The contacts of these coils are connected in three groups 19 of two contacts each with the two contacts in each group connected in series and the groups connected in parallel. The two contacts in each group are associated with relays energized by different logic trains. Thus, the first group includes the make contacts of relays A and B; the second, contacts of relays (A) and (C); and the third, contacts of relays (B) and C. Hence, it will be seen from FIG. 1, that for any combination of actuation signals generated on the lines 9 by two out of three of the logic trains 7, contacts will be closed in the power interface 13 to actuate the load device 11 by completing a circuit between the voltage source V and the device. With this power interface, protection against spurious actuations is provided by requiring confirmation of the abnormal condition by at least two of the logic trains, yet a failure in any one logic channel will not disable the system. Alternatively, one relay with two sets of contacts could be used instead of the two separate relays, such as A and (A) connected to each logic train.

In order to provide an on-line test capability of the power interface 13, each of the switches 15 is shunted by a resistor R1, and a current monitor 21 is connected in each branch of the switching network. A microprocessor based tester 23 generates test signals which are applied through lines 25 to the logic trains to cause the latter to selectively generate the actuation signals a, b and c. The current registered by each of the current monitors 21 is feedback to the tester 23 over lines 27.

The resistors R1 provide a leakage path through each group 19 of switches in the power interface 13, however, they are selected to have an impedance which is several magnitudes greater than that of a closed switch so that the total leakage current is insufficient to energize the load 11. By way of example, for a load device 11 with an impedance of 120 ohms, and a power supply voltage of 120 volts, a suitable value for the resistors R1 is 30,000 ohms. Under these conditions, if both switches in one leg of the switching network are open, the corresponding current monitor 21 will register a current of about 2 milliamps and the load will not be energized. This is defined as the "OFF" state. If just one of the switches is closed, the current will be about 4 milliamps and this is defined as the "ON" state for the interface employing make contacts although the load will still be deenergized at this current level. When both switches in a group 19 are closed, the current is about 1 amp and the load is energized. This is also defined as an "ON" state.

While a simple "ON" indication does not indicate which of the two switches in a group is closed, the operablilty of each device can be checked by forcing the inputs using the tester 23 and monitoring the "OFF"/"ON" status of each branch in the switching network. Thus, the tester 23 generates a pattern of test signals and compares the results reported back by the current monitors 21 with a stored expected pattern of responses. Any deviation from the expected responses is identified as an indication of a malfunction.

Table I below illustrates the test sequence for the power interface circuit of FIG. 1 for the normally deenergized load shown:

TABLE I

| | NORMALLY DEENERGIZED LOAD | | | |
|---|---|---|---|---|
| Step | Operation | $I_1$ | $I_2$ | $I_3$ |
| 1. | no actuation signal | OFF | OFF | OFF |
| 2. | actuation signal a | ON | ON | OFF |
| 3. | actuation signal b | ON | OFF | ON |
| 4. | actuation signal c | OFF | ON | ON |

The circuit of FIG. 1 can also be used with normally energized loads in which case the switches 15 would all comprise break contacts of the associated relays, and the load device 11 would be actuated by interruption of the energizing current in response to generation of two out of three of the actuation signals a, b and c. In this instance, the "OFF" state is defined as a condition in which at least one of the break contacts in a group is open. The power interface circuit 13 utilizing break contacts would be tested in the same manner as discussed above through generation of a pattern of actuation signals under the direction of the tester 23. Table II below illustrates the test sequence for the circuit of FIG. 1 with a normally energized load:

TABLE II

| | NORMALLY ENERGIZED LOAD | | | |
|---|---|---|---|---|
| Step | Operation | $I_1$ | $I_2$ | $I_3$ |
| 1. | no actuation signals | ON | ON | ON |
| 2. | actuation signal a | OFF | OFF | ON |
| 3. | actuation signal b | OFF | ON | OFF |
| 4. | actuation signal c | ON | OFF | OFF |

Since the invention does not require any change in circuit topology for the test sequence, and hence, the resistors R1 and the current monitors 21 remain effective during normal operation, the system can be continuously monitored without degrading the protection function. Accordingly, all of the current monitors should be "OFF" for a normally energized load and should be in an "ON" state for a normally deenergized load, under normal operating conditions when no test is being conducted. Conversely, they should all be in the opposite states when conditions in the reactor warrant actuation of the protection function. Any deviation from these all "ON" or "OFF" states indicates a malfunction in the system, and through continuous monitoring could be detected when they occur without waiting for a test sequence.

Figure 2:
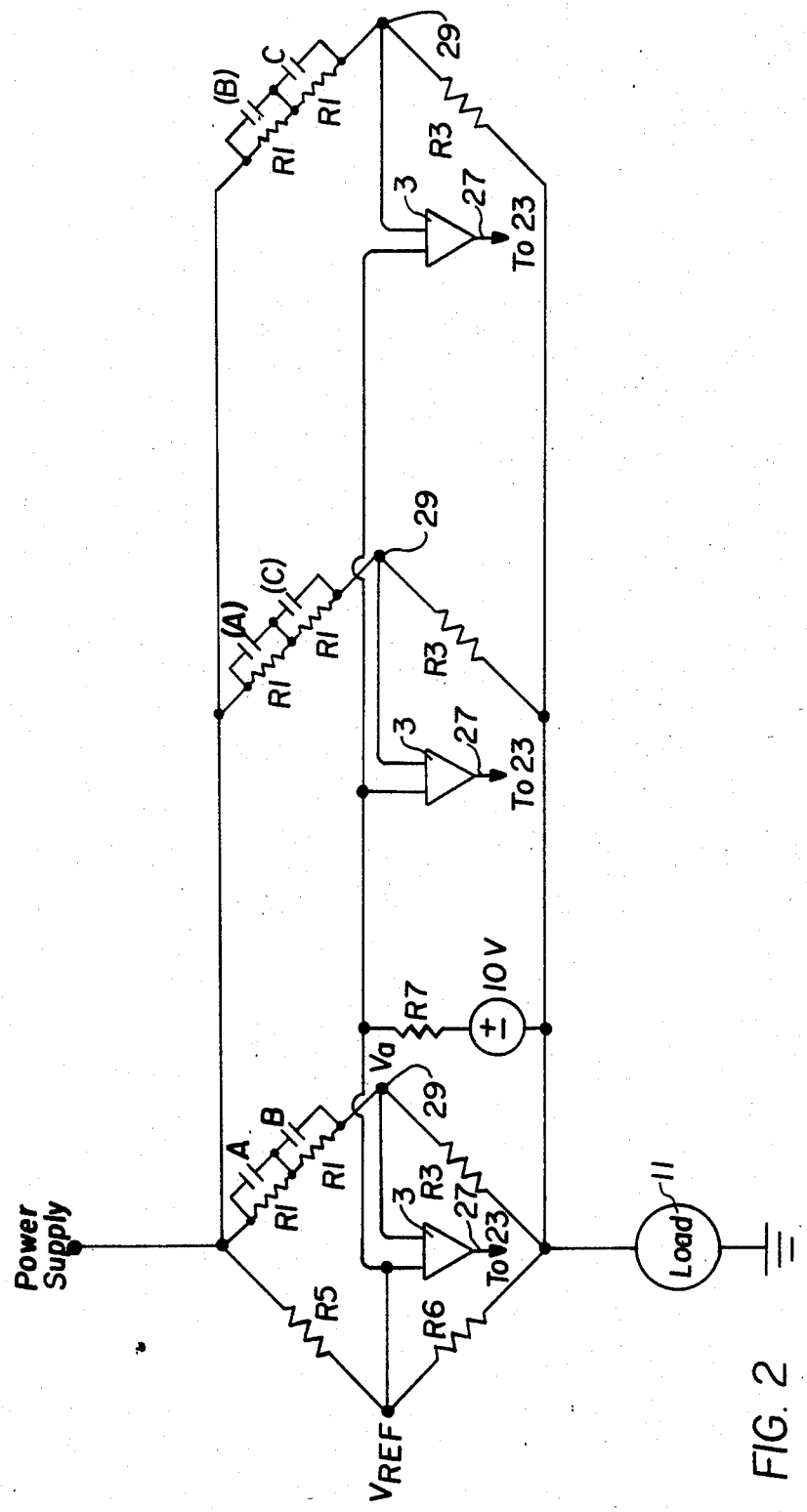
FIG. 2 is a schematic diagram of a portion of the protection system of FIG. 1 which is modified in accordance with the invention to provide self-compensation for variations is supply voltage.

In order to overcome the effects of large fluctuations in the magnitude of the voltage of the power source V which were mentioned above, the groups 19 of switches 15 are incorporated into a series of parallel resistance bridges as shown in FIG. 2. The resistor shunted switches 15 of each group form one leg of a wheatstone bridge circuit and are connected in series with a reference resistor R3, forming a second leg, at a first node 29. Reference resistors R5 and R6 forming the remaining two legs of the bridge circuit generate a reference voltage, Vref, at a second node 31. The legs formed by resistors R5 and R6 are shared by each of the three bridge circuits so that a common Vref is generated. Each bridge is spanned between nodes 29 and 31 by a comparator 33 which compares the voltage drop generated by the associated group of resistor shunted switches 15 with Vref. The comparator 33 generates a digital output which assumes an "ON" state when the voltage at the first node 29 exceeds Vref indicating that at least one of the normally open resistor shunted switches is closed, and assumes an "OFF" state, indicating that both switches are open, when Vref exceeds the voltage at node 29. Reference to Tables I and II will confirm that each switching state that the interface is capable of assuming can be verified by interrogating the digital status of each comparator 33 in light of the inputs imposed by tester 23.

The key advantage of the bridge circuits is that a change in power supply voltage, which of course, will produce a change in the voltage at node 29, is compensated for by a similar change in Vref. For example, if we select R1=30k ohms, R3=2 ohms, R5=450K ohms, and R6=20 ohms, a power supply voltage of 120 volts will result in Vref=5.33 millivolts and:

Va=4 millivolts (both switches open)
Va=8 millivolts (one switch open).

Thus, it can be seen that the values of R5 and R6 have been selected such that Vref lies about midway between the value of Va, the voltage at node 29, with both switches open and the value of Va with one switch closed. If the supply drops to 100 volts, Vref will drop to 4.4 millivolts and:

Va=3.33 millivolts (both switches open)
Va=6.66 millivolts (one switch open).

Likewise, if the supply voltage rises to 150 volts, Vref=6.66 millivolts and:

Va=5 millivolts (both switches open)
Va=10 millivolts (one switch open).

It should be noted that over this wide range of supply voltages, the comparator trip point, Vref, remains about midway between the two possible values of Va, and that those two values remain distinct.

A further advantage of the invention is that the feedback signals on lines 27 consist of 3 single bit signals which directly specify the switching state of the interface rather than current magnitudes from which the switching state is deduced.

The above analysis applies to testing an interface circuit with a normally open output. For a normally closed type of output, the comparator reference would be almost zero since most of the voltage drop would appear across the load 11 with the resistors R1 shunted by closed switches. As shown in FIG. 2, a 10 volt supply and resistor R7, chosen as 200K ohms for this example, add a small bias, 1 millivolt, to the reference voltage to allow the comparator to function when the voltage across the bridge is small due to one of the legs being energized. The voltage Va applied to the comparators 33 is 0.66 volt when all three groups 19 of switches 15 are conducting. When a normally closed switch is open in two groups of switches and only one group of switches conducts, as would be the case during testing, the voltage Va applied by the two non-conducting groups of switches to the associated comparator 33 would be zero volts and the voltage applied to the comparator by the conducting groups of switches would be about 2 volts. By adding the 1 millivolt bias to Vref, a definite difference is generated between Vref and Va for the conducting group of switches, and again, a reliable single bit digital signal is generated despite variations in supply voltage.

Figure 3:
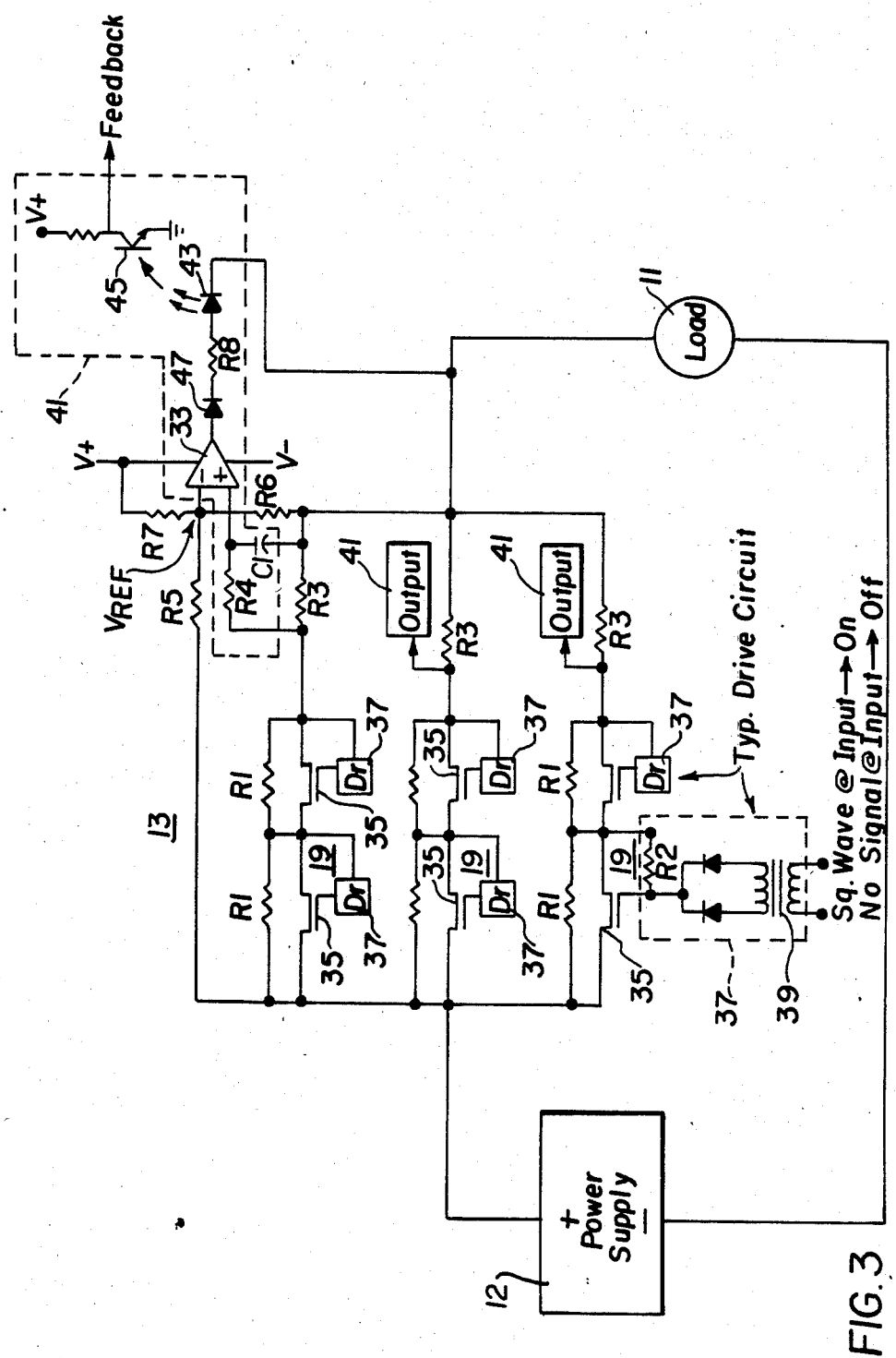
FIG. 3 is a schematic diagram of the portion of the protection system of FIG. 2 adapted for the use of solid state switching devices.

FIG. 3 illustrates a practical circuit for implementing the invention for d-c power interfaces utilizing solid state switching devices. In place of the relays, power FETs 35 are utilized as the switching devices between the load 11 and power supply 12. The FETs are switched by square wave actuation signals a, b and c generated by the logic trains 7 through conventional drive circuits 37 which convert the a-c logic signal to a d-c control signal. The transformers 39 in the drive circuit provide isolation between the logic trains 7 and the power interface 13.

As in the case of the power interface of FIG. 2, the FETs of FIG. 3 are arranged in resistance measuring bridge circuits. The output circuit 41 for each group of switches includes the comparator 33 which compares Vref generated by the resistors R5 and R6 with the voltage at node 29. The voltage at node 29 is applied to the positive input of the comparator 33 through an input resistor R4 with the switching noise filtered out by a capacitor C1. An LED 43 is energized by the digital output of the comparator 33 when the voltage Va exceeds Vref. Radiation from the LED 43 turns ON a phototransistor 45 to provide an isolated output for the comparator. A diode 47 prevents reverse biasing of LED 43. Similar isolated, single bit digital output circuits 41 are provided for each of the other groups 19 of switches.

Each of the FETs 35 is turned ON when a square wave signal is applied to the drive circuit 37. Thus, for a normally deenergized load 11, no signal is applied to the drive circuits under normal conditions so that the FETs are OFF. Under these conditions, the voltage, Va, at node 29 for each of the groups of switches is lower than Vref so that the output of the comparator 33 is low, the LED is OFF and therefore the phototransistor does not conduct. As a result, the digital output FEEDBACK signal which is returned to the tester over line 27 is high. When the tester induces a logic train 7 to generate a square wave actuation signal, one of the FETs in each of two of the groups 19 of switches is turned ON. This raises the voltage at node 29 above Vref for those groups of switches, causing the comparators to turn ON the associated LEDs, which in turn, turn on the phototransistors to cause their FEEDBACK signals to go low.

Conversely, for a normally energized load, a square wave signal is normally applied to the drive circuits of the FETs to keep them turned ON. This results in the voltage at node 29 being higher than Vref and the phototransistor conducts to pull the output down. Thus, under normal conditions, a low level FEEDBACK signal is returned over line 27 to the tester. This is the opposite of the case with the normally deenergized load discussed above. Generation of an actuation signal by a logic train 7, either on its own or under the direction of the tester, removes the square wave signal from the appropriate FET drive circuit which turns those switches OFF. The voltage applied to the associated comparators will then be lower than Vref so that these LEDs will be OFF. Since this will turn OFF the associated phototransistors, their FEEDBACK signals will be high.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An n out of m voted logic power interface circuit for connecting a load device to an electric power source with means providing an indication of the state of switches within the circuit, said power interface circuit comprising:

m sets of switches arranged in a plurality of groups of switches with said groups of switches connected in parallel with each other and in series with the load device and the electric power source, each said group of switches including a different selection of n switches connected in series each from a different one of said m sets of switches, said plurality of groups of switches comprising all possible different combinations of m sets taken n at a time, such that with at least n out of m sets of switches actuated the load device is actuated;

a resistor shunting each of said switches to provide a leakage path through each group of switches, the impedance of said resistors being several magnitudes larger than that of a closed switch such that the current through said leakage paths is insufficient to energize the load; and detector means connected to each group of switches and responsive to a change in impedance produced by actuation of a resistor shunted switch in said group to generate a signal having one value when none of said switches in the group are actuated and a second value when at least one of said switches in the group is actuated.

2. The power interface of claim 1 wherein each said detector generates a one bit digital signal having one value when none of the switches in the group are actuated and a second value when t least one switch in the group is actuated.

3. The power interface circuit of claim 2 including bridge circuit means for each group of switches connected in series with the load and comprising four legs, a first leg comprising said group of resistor shunted switches, a second leg comprising a first reference resistor connected in series with the first leg at a first common node and a third and a fourth leg comprising second and third reference resistors respectively connected in series at a second common node, said series connected first and second legs being connected in parallel with the series connected third and fourth legs and wherein said detector means comprises a comparator connected across said first and second nodes, the values of said first, second and third reference resistors being selected relative to the resistors shunting said switches such that with none of said switches actuated the comparator has a first output and with at least one of said switches actuated the comparator has a second output, despite variations in the voltage output of the electric power source.

4. The power interface circuit of claim 3 wherein a common third and a common fourth leg are shared by the bridge circuits associated with each of the groups of switches.

5. The power interface circuit of claim 3 wherein said switches are normally closed such that said load is actuated by opening n out of m sets of said normally closed switches, and including means for applying a bias voltage to said comparators at said second node to provide a reference voltage for the comparators with all of the switches in a group closed.

6. A protection system for a nuclear reactor comprising:

redundant sets of sensors for monitoring preselected reactor parameters and operating conditions and for generating redundant partial actuation signals in response to preselected values and conditions;

three independent logic trains, to each of which each redundant partial actuation signal is applied, said logic trains each generating an actuation signal in response to a preselected number of the redundant partial actuation signals;

a load;

a voltage source;

three pairs of switches connected in three groups of two switches each with the two switches in each group associated with a different pair of switches and being connected in series, and with the three groups of switches being connected in parallel with each other and in series with the load across the voltage source;

means for applying a different one of said actuating signals independently to each of said pairs of switches to actuate the same, and thereby actuate the load, when two out of the three actuation signals are generated;

a resistor shunting each switch to provide a leakage path through each group of switches, the impedance of said resistors being several magnitudes larger than that of a closed switch such that the current through said leakage paths is insufficient to energize the load;

detector means connected to each group of switches and responsive to the change in impedance produced by actuation of a resistor shunted switch in the group to provide a digital signal having a first value when neither of the switches in the group is actuated and a second value when at least one of said switches in the group is actuated; and test means for selectively generating actuating signals and for monitoring said detector means for preselected patterns of said digital signals.

7. The protection system of claim 6 including three wheatstone bridge circuits connected in parallel with each other and in series with the load and voltage source, each wheatstone bridge circuit including one of said groups of resistor shunted switches in one leg thereof and reference resistors in the other legs and wherein the detector means comprise comparators connected across each bridge circuit, the values of the reference resistors being selected in relation to each other and the shunt resistors such that a reference voltage generated by two of the reference resistors and applied to one input of the comparator is about midway between voltages generated, by said group of resistors and the third reference resistor and applied to a second input of the comparator, when neither switch in the group is actuated and when one switch is actuated, despite variations in the voltage generated by said voltage source.

8. The protection system of claim 7 wherein the three wheatstone bridge circuits share a common reference voltage generating leg.

9. The protection system of claim 8 wherein the load is a normally energized device and is actuated by being deenergized, and wherein the switches are normally closed to energize the load device and including means to apply a bias voltage to said one input of each comparator.

10. A testable power interface circuit comprising: a load device, a voltage source and a wheatstone bridge circuit connected in series with the load device and voltage source, said wheatstone bridge circuit including as one leg, a switching network in which a plurality of switches must be actuated to actuate said load device, and resistors shunting each of said switches in the switching network to provide a leakage path therethrough with the value of said resistors being several magnitudes larger than the resistance of a closed switch such that the current through the leakage path is insufficient to actuate the load, said wheatstone bridge circuit having detector means which generates an output signal representative of the resistance of the switching network including the shunt resistors, and test means for selectively actuating fewer switches in said switching network than is required to actuate the load device and for comparing the output signal generated by the detector means with that expected in response to the actuated switches.

11. The testable power interface circuit of claim 10 wherein said detector means generates a digital output signal having a first value when no switches in the switching circuit are actuated and a second value when at least one switch is actuated.

12. The testable power interface circuit of claim 11 wherein said switching network comprises three pairs of resistor shunted switches connected in three groups of two switches each with two switches in each group associated with a different pair of switches and being connected in series, and wherein said wheatstone bridge circuit means includes three bridge circuits connected in parallel, each of which includes: a leg comprising one of said groups of resistor shunted switches, and a detector means which generates a digital output having a first value when neither switch in the associated group of switches is actuated and a second value when at least one of said switches in the group is actuated.

13. The testable power interface circuit of claim 12 wherein said three wheatstone bridge circuits share common reference voltage generating legs.

* * * * *